United States Patent
Zhang et al.

(10) Patent No.: US 8,830,628 B1
(45) Date of Patent: Sep. 9, 2014

(54) METHOD AND SYSTEM FOR PROVIDING A PERPENDICULAR MAGNETIC RECORDING HEAD

(71) Applicant: Western Digital (Fremont), LLC, Fremont, CA (US)

(72) Inventors: Hong Zhang, Fremont, CA (US); Ge Yi, San Ramon, CA (US); Lei Wang, Danville, CA (US); Dujiang Wan, Fremont, CA (US); Guanghong Luo, Fremont, CA (US); Xiaohai Xiang, Danville, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/779,529

(22) Filed: Feb. 27, 2013

Related U.S. Application Data

(62) Division of application No. 12/391,095, filed on Feb. 23, 2009, now Pat. No. 8,404,128.

(51) Int. Cl.
*G11B 5/17* (2006.01)
(52) U.S. Cl.
USPC ...................................... 360/125.3
(58) Field of Classification Search
CPC ............................................. G11B 5/39
USPC ...................................... 360/125.3
See application file for complete search history.

(56) References Cited

U.S. PATENT DOCUMENTS

| | | | |
|---|---|---|---|
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |

(Continued)

OTHER PUBLICATIONS

Office Action dated Jan. 27, 2012 from U.S. Appl. No. 12/391,095, 14 pages.

(Continued)

*Primary Examiner* — Mark Blouin

(57) ABSTRACT

A method and system for providing a magnetic recording transducer having a pole are disclosed. The pole has side(s), a bottom, and a top wider than the bottom. The method and system include providing at least one side gap layer that covers the side(s) and the top of the pole. At least one sacrificial layer is provided on the side gap layer(s). The sacrificial layer(s) are wet etchable and cover the side gap layer(s). The magnetic recording transducer is planarized after the sacrificial layer(s) are provided. Thus, a portion of the side gap and sacrificial layer(s) is removed. A remaining portion of the sacrificial layer(s) is thus left. The method and system also include wet etching the sacrificial layer(s) to remove the remaining portion of the sacrificial layer(s). A wrap around shield is provided after the remaining portion of the sacrificial layer(s) is removed.

5 Claims, 7 Drawing Sheets

(56) References Cited

U.S. PATENT DOCUMENTS

| | | | |
|---|---|---|---|
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |

(56) References Cited

U.S. PATENT DOCUMENTS

| | | | |
|---|---|---|---|
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |

(56) References Cited

U.S. PATENT DOCUMENTS

| | | |
|---|---|---|
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,657,992 B2 * | 2/2010 | Han et al. ............. 29/603.24 |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |

(56) References Cited

U.S. PATENT DOCUMENTS

| | | |
|---|---|---|
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 2004/0085674 A1 | 5/2004 | Han et al. |
| 2005/0024774 A1 | 2/2005 | Fontana, Jr. et al. |
| 2005/0066517 A1 | 3/2005 | Bedell et al. |
| 2006/0044682 A1 | 3/2006 | Le et al. |
| 2006/0262453 A1 | 11/2006 | Mochizuki et al. |
| 2008/0100959 A1 | 5/2008 | Feldbaum et al. |
| 2008/0110761 A1 | 5/2008 | Lam et al. |
| 2008/0113090 A1 | 5/2008 | Lam et al. |
| 2008/0144215 A1 | 6/2008 | Hsiao et al. |
| 2008/0151437 A1* | 6/2008 | Chen et al. .............. 360/319 |
| 2008/0244896 A1 | 10/2008 | Bonhote et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |

OTHER PUBLICATIONS

Office Action dated Jul. 16, 2012 from U.S. Appl. No. 12/391,095, 14 pages.

Advisory Action dated Oct. 17, 2012 from U.S. Appl. No. 12/391,095, 3 pages.

Notice of Allowance date Nov. 30, 2012 from U.S. Appl. No. 12/391,095, 9 pages.

* cited by examiner

ABS View

Side View

METHOD AND SYSTEM FOR PROVIDING A PERPENDICULAR MAGNETIC RECORDING HEAD

CROSS-REFERENCE TO RELATED APPLICATIONS

This application is a divisional of U.S. patent application Ser. No. 12/391,095, filed on Feb. 23, 2009, which is hereby incorporated by reference in its entirety.

BACKGROUND

FIG. 1 is a flow chart depicting a conventional method 10 for fabricating a conventional perpendicular magnetic recording (PMR) transducer. For simplicity, some steps are omitted. The conventional method 10 commences after the high moment layer(s) for the PMR pole are deposited, for example by plating. At least a hard mask is provided, via step 12. Step 12 may also include depositing other conventional layers, such as a chemical mechanical planarization (CMP) stop layer. The hard mask and other layers may be blanket deposited, then patterned using conventional photolithography. The pole layer(s) are then trimmed, via step 14. Step 14 is used to form the conventional PMR pole. The top, or trailing edge, of the conventional PMR pole is thus wider than the bottom of the conventional PMR pole.

Side gap material(s) may then be deposited, via step 16. Step 16 typically includes depositing a nonmagnetic layer, such as aluminum oxide. Side shield material(s) may then be deposited, via step 18. Step 18 may be used if side shields are desired for the conventional PMR transducer. A CMP is then performed, via step 20. The stop layer that might be provided in step 12 might be used to terminate the CMP.

Bevel(s) may also be provided in the conventional PMR pole, via step 22. If a top bevel is to be provided, step 22 may include removing a top portion of the ferromagnetic pole materials in the region that the air-bearing surface (ABS) is to be formed. As a result, the top surface of the conventional PMR pole near the ABS is lower than the yoke portion of the PMR pole. If step 22 is to be used to form a bottom bevel, the step 22 is typically performed earlier in the method 10, for example prior to step 12. In such a case, step 22 may be used to ensure that the topology of the layer(s) on which the conventional PMR pole is formed is higher in proximity to the ABS. Step 22 may include masking a portion of the underlayer(s) and refilling the layer(s) near the ABS. In such a case, this portion of step 22 is performed before steps 12 and 14. As a result, a bottom bevel may be formed.

The write gap may then be provided, via step 24. Step 24 may include depositing a thin nonmagnetic layer that covers at least the top of the pole near the ABS. A portion of the write gap may optionally be removed, via step 26. Part of the write gap may be removed if the side shields are desired to be electrically connected to a top shield, forming a wrap around shield. Step 26 would then typically include providing a mask that covers the pole and side gaps and removing the exposed portion of the write gap. If the top shield is desired to float, or be electrically unconnected to the side shields, then step 26 may be omitted. The conventional top shield may then be provided, via step 28. Fabrication of the conventional PMR transducer may then be completed.

FIG. 2 depicts a conventional PMR transducer 50 formed using the method 10. The conventional PMR transducer 50 includes a pole 54 formed on one or more conventional underlayers 52. Also shown are conventional side gaps 56, conventional side shields 58, conventional write gap 60, and conventional top shield 62. In the conventional PMR transducer 50, the conventional side shields 58 are electrically connected to the conventional top shield 62, to form a conventional wrap around shield.

Although the conventional method 10 may provide the conventional PMR transducer 50, there may be drawbacks. Misalignment may occur in, for example, step 26. More specifically, the mask used to cover the pole 54 during formation of the conventional write gap 60 may not be centered on the pole 54. As a result, there may be more stray edge fields during use of the conventional PMR transducer. If portions of the write gap 58 are not removed, the conventional top shield 60 may float. Such a conventional PMR transducer may also have higher edge stray fields. Consequently, the conventional PMR transducer 50 may be subject to erasure issues, for example erasure of side tracks. Performance of the conventional PMR transducer 50 may thus be compromised.

Accordingly, what is needed is an improved method for fabricating a PMR transducer.

SUMMARY

A method and system for providing a magnetic recording transducer having a pole are disclosed. The pole has at least one side, a bottom, and a top wider than the bottom. The method and system include providing at least one side gap layer that covers the side(s) and the top of the pole. The method and system also include providing at least one sacrificial layer on the side gap layer(s). The at least one sacrificial layer is wet etchable and covers the side gap layer(s). The magnetic recording transducer is planarized after the sacrificial layer(s) are provided. Thus, a portion of the side gap and sacrificial layer(s) is removed. A remaining portion of the sacrificial layer(s) is thus left. The method and system also include wet etching the sacrificial layer(s) to remove the remaining portion of the sacrificial layer(s). A wrap around shield is provided after the remaining portion of the sacrificial layer(s) is removed.

DETAILED DESCRIPTION OF THE PREFERRED EMBODIMENTS

Figure 1:
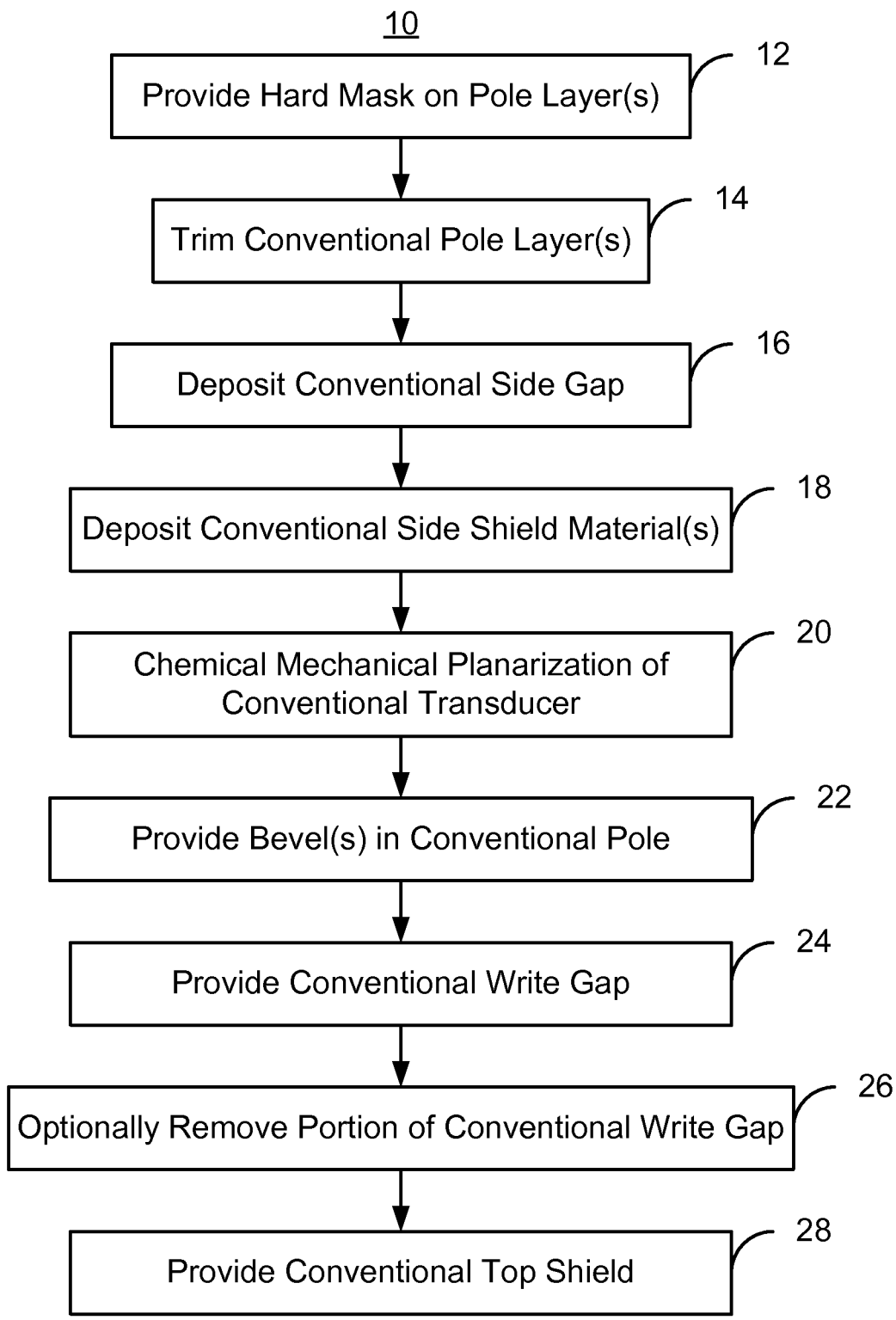
FIG. 1 is a flow chart depicting a conventional method for fabricating a PMR transducer.
Figure 2:
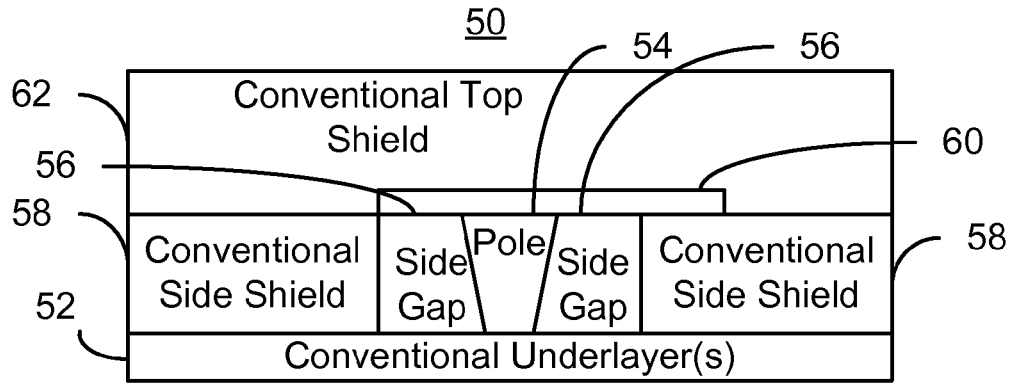
FIG. 2 is a diagram depicting a conventional PMR transducer.
Figure 3:
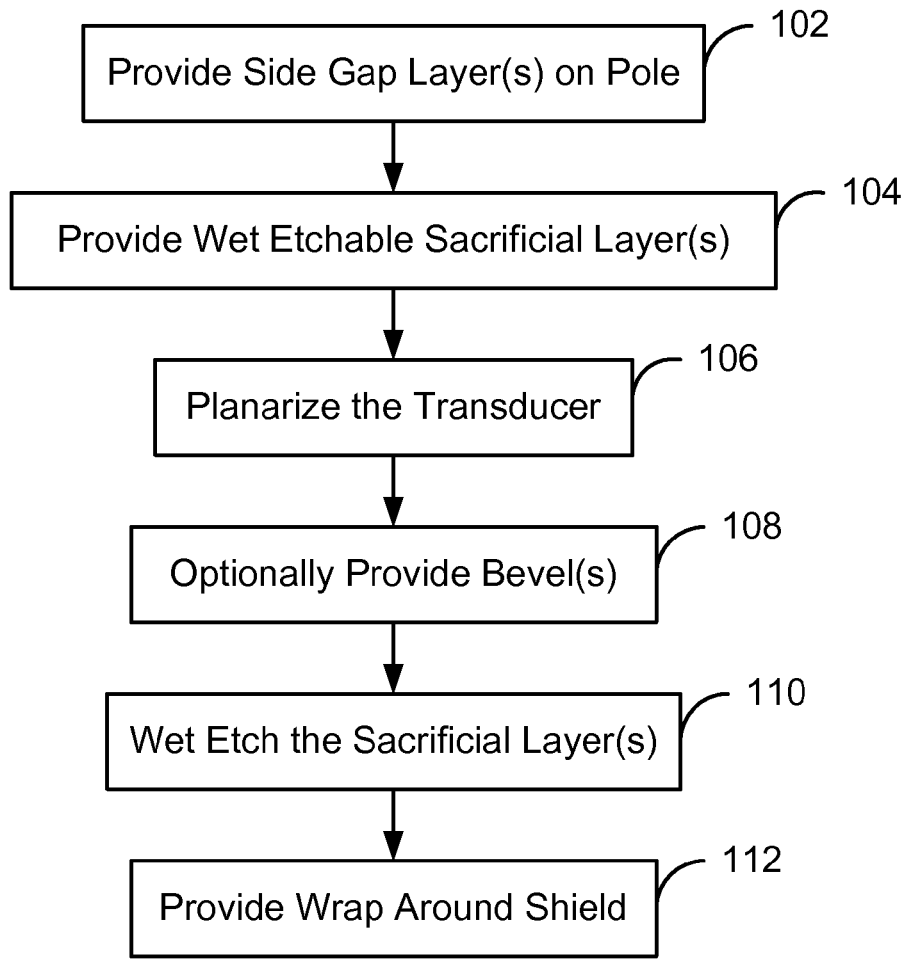
FIG. 3 is a flow chart depicting an exemplary embodiment of a method for fabricating a PMR transducer.

FIG. 3 is a flow chart depicting an exemplary embodiment of a method 100 for fabricating a transducer. The method 100 is described in the context of a PMR transducer, though other transducers might be so fabricated. For simplicity, some steps may be omitted. The PMR transducer being fabricated may be part of a merged head that also includes a read head (not shown) and resides on a slider (not shown) in a disk drive. The method 100 also may commence after formation of other portions of the PMR transducer. The method 100 is also described in the context of providing a single PMR pole and its associated structures in a single magnetic recording transducer. However, the method 100 may be used to fabricate multiple transducers at substantially the same time. The method 100 and system are also described in the context of particular layers. However, in some embodiments, such layers may include multiple sub-layers.

In one embodiment, the method 100 commences after formation of the underlayer(s) on which the PMR pole is to reside as well as the PMR pole itself. Formation of the PMR pole may include blanket deposition of the layer(s) for the PMR pole, for example by plating the high moment magnetic material(s). Such materials may include alloys and/or multilayers. A mask structure may then be provided on the pole layers. The mask structure may include a hard planarization stop layer, a hard mask layer, and a bottom antireflective coating (BARC) layer. The mask structure may be formed using photoresist mask(s) and photolithography. The PMR pole may then be formed by trimming the pole layer(s) with the mask structure in place. The pole layer(s) may be trimmed such that a trapezoidal PMR pole having a top wider than the bottom is formed. The top of the PMR pole may correspond to the trailing edge of the PMR pole during writing.

One or more side gap layers are provided, via step 102. The material(s) provided in step 102 are nonmagnetic and may be insulating. In some embodiments, step 102 includes depositing a layer of aluminum oxide. The side gap materials may be blanket deposited in the region of the PMR pole. Thus, the sides and the top of the PMR pole are covered by the side gap layer(s).

At least one sacrificial layer is provided on the side gap layer(s), via step 104. The sacrificial layer(s) are wet etchable and cover the side gap layer(s). Step 104 may include depositing a seed layer, then depositing the sacrificial layer, for example by plating. The material(s) for the sacrificial layer(s) deposited in step 104 may include one or more of NiFe, CoFe, CoNiFe, Ni, Cu, and Fe. In general, the material(s) used for the sacrificial layer(s) are desired to be wet etchable and able to be removed in a planarization in a similar manner to the side gap layer(s). In some embodiments, the material(s) are also desired to be plateable.

The magnetic recording transducer is planarized, via step 106. For example, a CMP may be performed in step 106. As a result, the top surface of the PMR transducer may be substantially flat, at least in the region of the PMR pole. As a result, a portion of the sacrificial layer(s) and a portion of the side gap layer(s) may be removed. The planarization in step 106 may be terminated at the CMP stop layer in the mask structure described above. In another embodiment, the planarization may be terminated in another manner.

Bevel(s) may optionally be provided, via step 108. Step 108 may include exposing the top of the PMR pole, if not already exposed. If a top bevel is to be provided, a portion of the PMR pole in the region close to the location where the ABS is to be formed (ABS location) is removed. To do so, another portion of the PMR pole distal to the ABS location is covered by a mask. The top of the exposed portion of the PMR pole is then removed, for example via ion milling. Thus a top bevel may be formed. If a bottom bevel is to be formed, the topology under the PMR pole is prepared such that the layer(s) under the pole are higher near the ABS location. In another embodiment, another mechanism may be used to form the bottom bevel.

The sacrificial layer(s) are wet etched, via step 110. As a result, any portion of the sacrificial layer(s) remaining is removed. Consequently, the side gap layer(s) are exposed. In some embodiments, step 110 also includes providing a mask that covers the PMR pole. In some such embodiments, at least a portion of the side gap layer(s) is also covered. After the mask is provided, the sacrificial layer(s) may be wet etched.

A wrap around shield may be provided, via step 112. In some embodiments, step 112 includes depositing a seed layer, then plating the wrap around shield. Step 112 may be performed after a write gap has been formed. In embodiments in which the write gap is metallic and has a sufficiently high conductivity, the seed layer may be omitted. Instead, the shield may be plated directly on the write gap. In other embodiments, for example where the write gap is an insulator, the seed layer may be used. Fabrication of the PMR transducer may then be completed.

Using the method 100, a PMR transducer may be formed. More specifically, a wrap around shield may be formed. Further, the wrap around shield may be provided without requiring masking and removal of a portion of the write gap. Consequently, misalignments of the write gap and the attendant increases in stray side fields may be reduced or eliminated. Using the method 100, therefore, a PMR transducer having improved performance may be fabricated.

Figure 4:
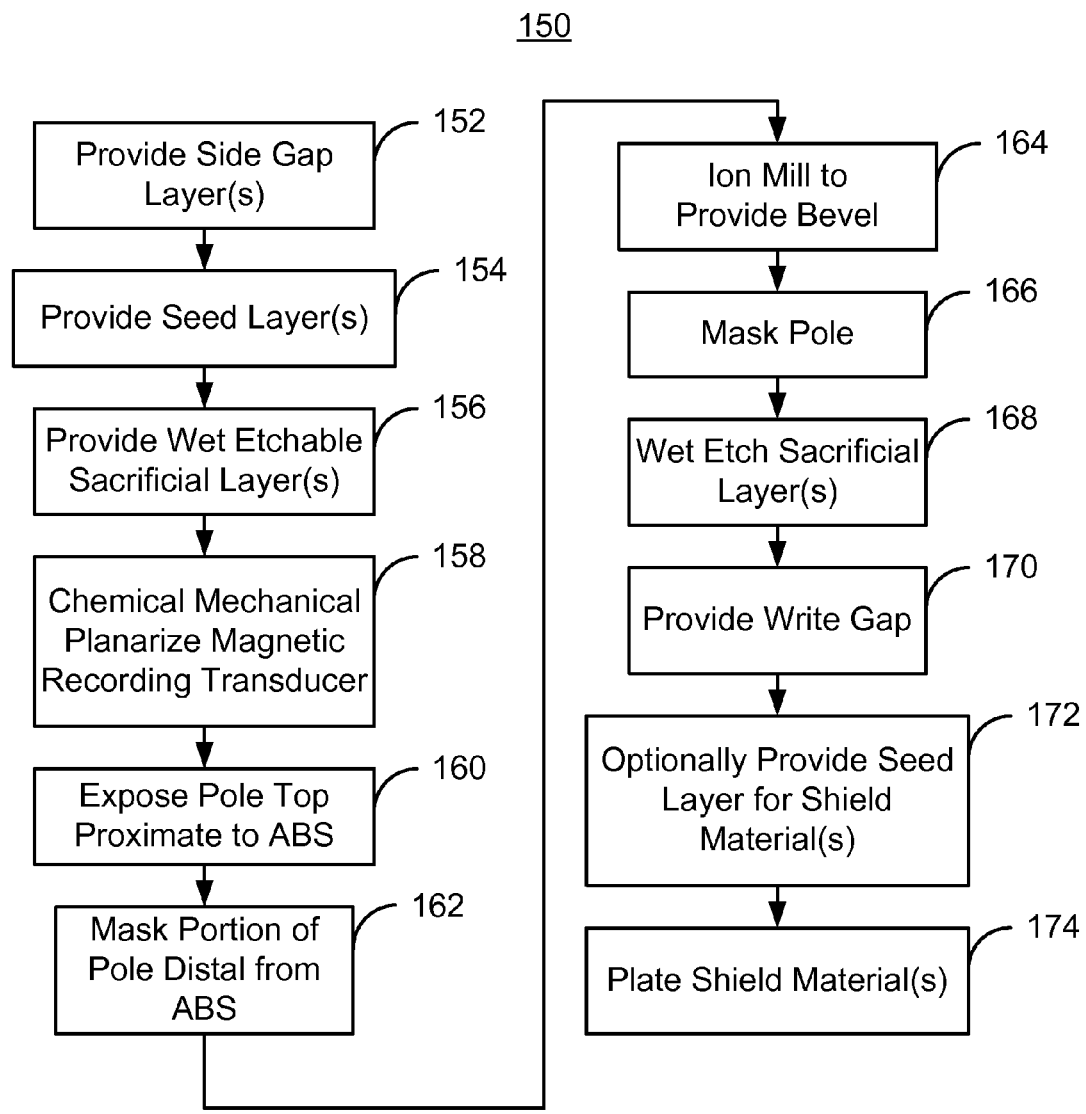
FIG. 4 is a flow chart depicting another exemplary embodiment of a method for fabricating a PMR transducer.

FIG. 4 is a flow chart depicting another exemplary embodiment of a method 150 for fabricating a PMR transducer. For simplicity, some steps may be omitted. FIGS. 5-13 are diagrams depicting an exemplary embodiment of a PMR transducer 200 as viewed from the ABS during fabrication. For clarity, FIGS. 5-13 are not to scale. Referring to FIGS. 4-13, the method 150 is described in the context of the PMR transducer 200. However, the method 150 may be used to form another device (not shown). The PMR transducer 200 being fabricated may be part of a merged head that also includes a read head (not shown) and resides on a slider (not shown) in a disk drive. The method 150 also may commence after formation of other portions of the PMR transducer 200. The method 150 is also described in the context of providing a single PMR transducer. However, the method 150 may be used to fabricate multiple transducers at substantially the same time. The method 150 and device 200 are also described in the context of particular layers. However, in some embodiments, such layers may include multiple sublayers.

Figure 5:
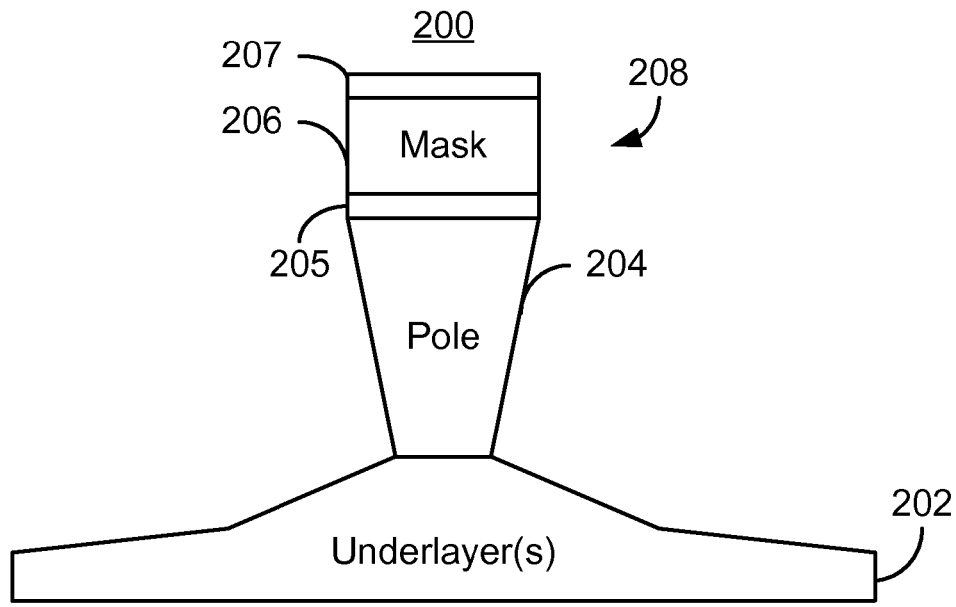
FIGS. 5-13 are diagrams depicting an exemplary embodiment of a perpendicular magnetic recording transducer during fabrication.

In one embodiment, the method 150 commences after formation of the underlayer(s) on which the PMR pole is to reside as well as the PMR pole itself. Formation of the PMR pole may include blanket deposition of the layer(s) for the PMR pole, for example by plating the high moment magnetic material(s). Such materials may include alloys and/or multilayers. A mask structure may then be provided on the pole layers. The PMR pole may then be formed by trimming the pole layer(s) with the mask structure in place. The pole layer(s) may be trimmed such that a trapezoidal PMR pole having a top wider than the bottom is formed. The top of the PMR pole may correspond to the trailing edge of the PMR pole during writing. For example, FIG. 5 depicts one embodiment of the transducer 200 before the method 150 commences. The PMR transducer 200 includes one or more underlayer(s) 202, pole 204, and mask structure 208. The mask structure 208 shown includes a CMP stop layer 205, a hard mask 206, and a bottom BARC layer 207. The mask structure 208 may be formed using photolithography. The PMR pole 204 is fabricated by trimming magnetic pole layer(s) with the mask structure 208 in place.

Figure 6:
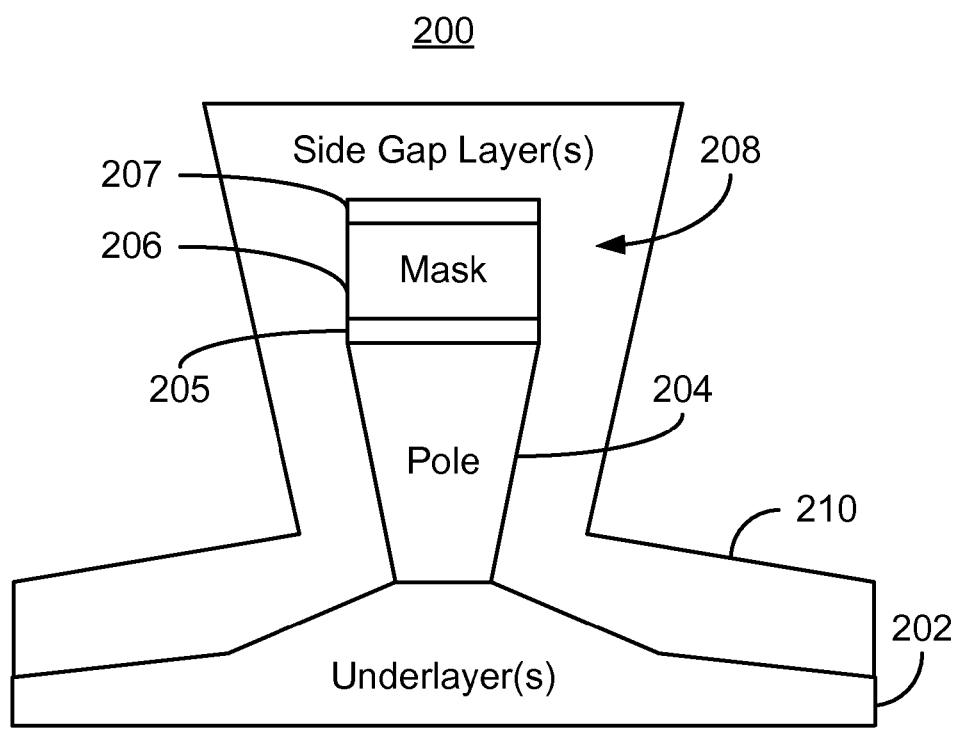

Side gap layer(s) are provided on the pole 204, via step 152. The side gap layer(s) are nonmagnetic and, in some embodiments, insulating. In some embodiments, step 152 includes depositing an aluminum oxide layer. FIG. 6 depicts the transducer 200 after step 152 is performed. Thus, side gap layer(s) 210 are shown. In some embodiments, the side gap layer(s) 210 cover the pole 204.

One or more seed layers are provided on the side gap layer(s), via step 154. The seed layers may be used to allow plating of the sacrificial layers, described below, on the aluminum oxide side gap layer(s). Like the sacrificial layer(s), the seed layer is desired to be wet etchable.

Figure 7:
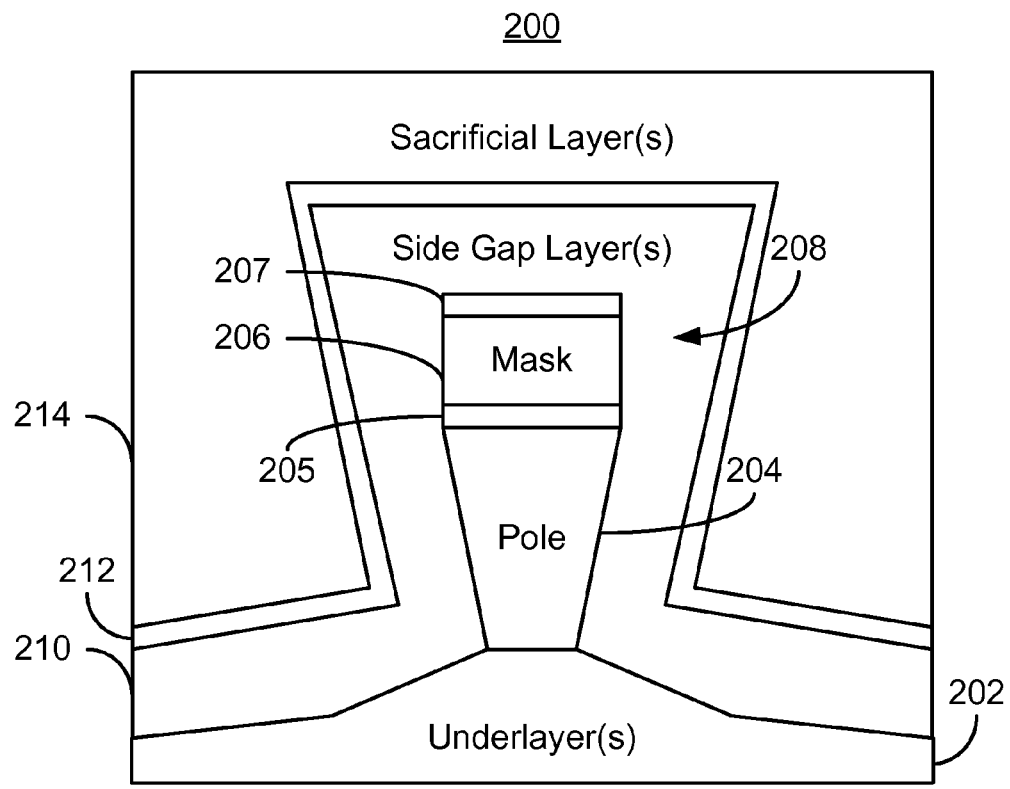

At least one sacrificial layer is plated, via step 156. The sacrificial layer(s) are plated on the seed layer(s) and thus also on the side gap layer(s). The sacrificial layer(s) are also wet etchable and cover the side gap layer(s). The material(s) for the sacrificial layer(s) plated in step 156 may include one or more of NiFe, CoFe, CoNiFe, Ni, Cu, and Fe. However, in other embodiments, other materials may be used. In general, the material(s) used for the sacrificial layer(s) are desired to be plateable, wet etchable and able to be removed in a planarization at a similar rate to the side gap layer(s). FIG. 7 depicts the transducer 200 after the sacrificial layer(s) are deposited. Thus, an optional seed layer 212 and sacrificial layers 214 are shown.

Figure 8:
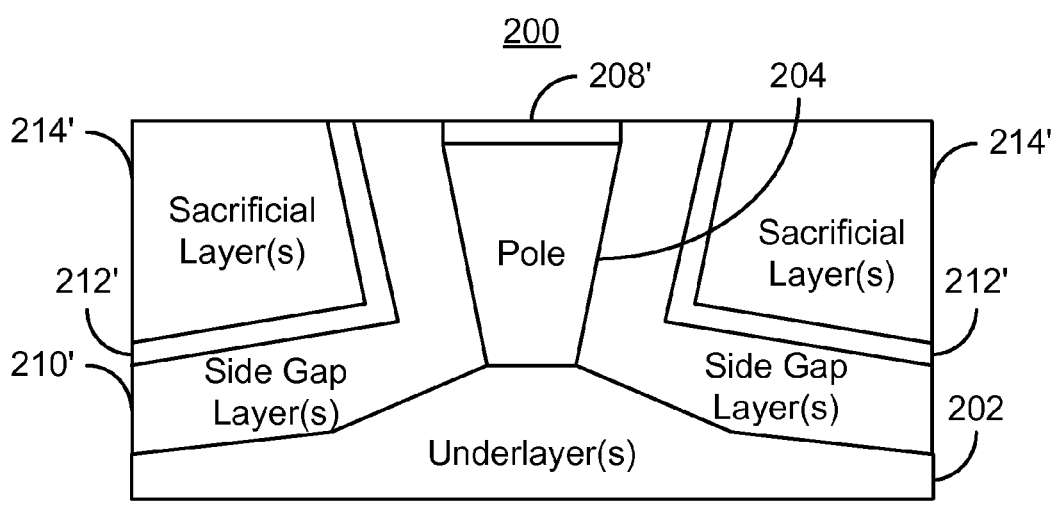

The magnetic recording transducer is planarized using a CMP, at least in the region of the PMR pole 204, via step 158. FIG. 8 depicts the transducer 200 after step 158 is performed. As a result of the CMP, the top surface of the PMR transducer 200 may be substantially flat. Further portions of the sacrificial layer(s) 214, seed layer(s) 212 and side gap 210 are removed. Consequently, remaining portions of the sacrificial layer(s) 214', seed layers 212', and side gap layer(s) 210' are shown. A portion of the mask structure 208 has also been removed, leaving mask structure 208' which may correspond to the CMP stop 205. Thus, the CMP of step 158 may be terminated at the CMP stop layer (shown as remaining portions of mask structure 208' in FIG. 8). In other embodiments, the planarization may be terminated in another manner.

The top of the pole 204 proximate to the ABS is exposed, via step 160. In some embodiments, the entire top of the pole 204 is exposed in step 160. Step 160 may include removing the remaining portion of the mask 208', for example through a reactive ion etch.

Figure 9:
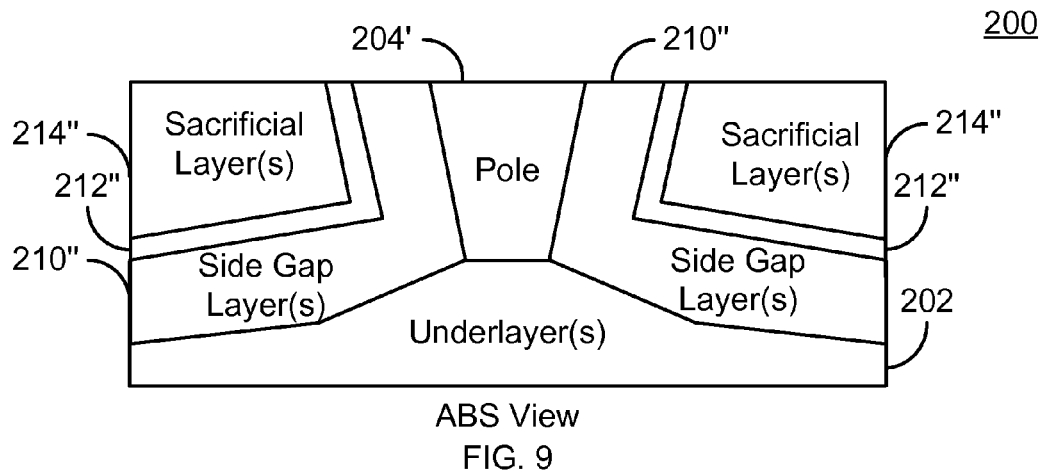
Figure 10:
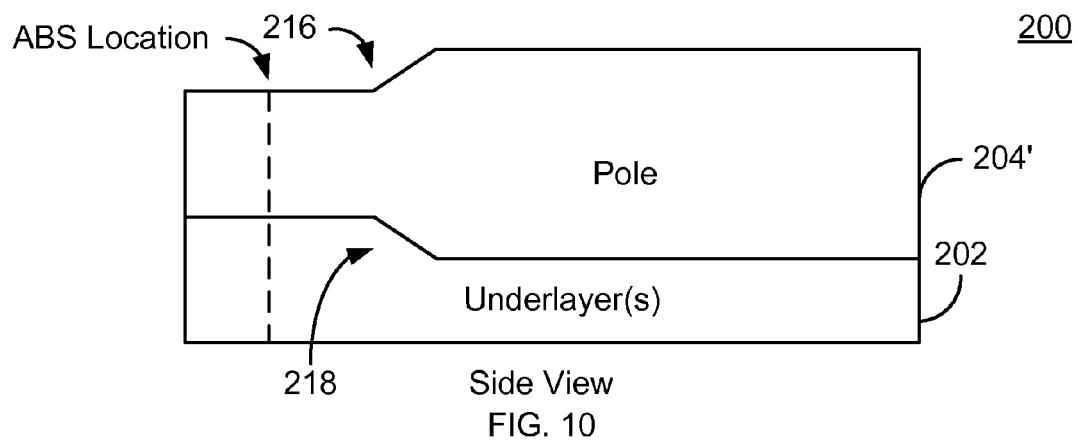

Bevel(s) may also optionally be provided. A bottom bevel may be provided through appropriate formation of the topology underlying the pole 204, prior to the method 100 commencing. A top bevel may also be provided, for example through steps 162-164, described below. A mask that covers the portion of the pole 204 distal to the ABS location is provided, via step 162. The top of the exposed portion of the pole 204, proximate to the ABS, is then removed, via step 164. Step 164 may be performed via ion milling. The ion milling may also be performed at an angle from normal to the surface of the transducer 200. Thus, a bevel is formed in the top of the pole 200. Once the top bevel is formed, the mask may be removed. FIGS. 9-10 depict the transducer after step 164 is performed. FIG. 9 depicts an ABS view, while FIG. 10 depicts a side view. The pole 204' is shown in FIG. 9 as having a lower height because a portion of the pole has been removed proximate to the ABS location. Thus, the top bevel 216 is formed. In the embodiment shown, the pole 204' also includes a bottom bevel 218. However, the bottom bevel 216 may be omitted. The top bevel 216 may be a trailing edge bevel, while the bottom bevel 218 may be a leading edge bevel. In addition, the heights of the side gap layers 210", the seed layers 212" and the sacrificial layers 214" may be reduced near the ABS. The ABS location shown in FIG. 10 corresponds to the location of the ABS once lapping and other fabrication of the transducer 200 is completed. In another embodiment, the ABS location may have been set prior to step 164. In such an embodiment, the ABS location may be at the end of the pole 204'.

The pole 204' is masked, via step 166. The mask covers the top of the pole but exposes at least part of the remaining sacrificial layer(s) 214". Thus, the mask is configured to prevent a wet etchant from reaching the pole 204', but allows the etchant to reach the sacrificial layer(s) 214".

Figure 11:
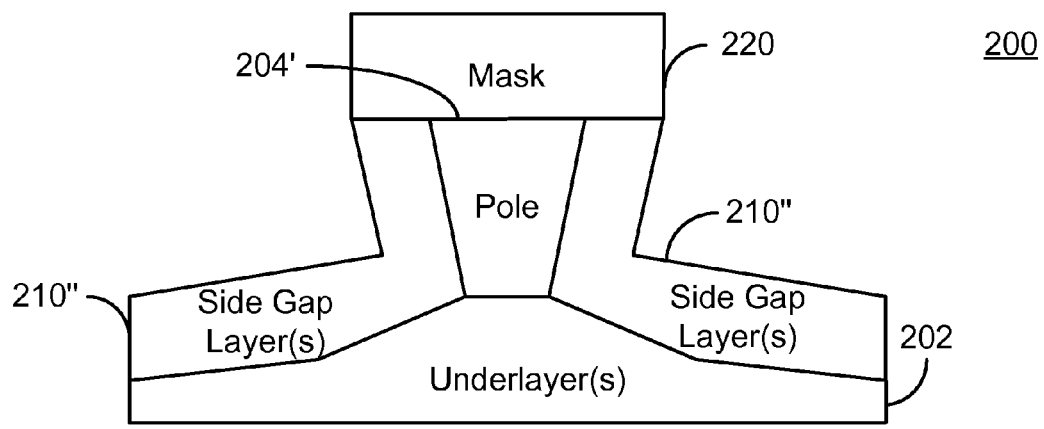

The sacrificial layer(s) 214" are wet etched, via step 168. As a result, any portion of the sacrificial layer(s) 214" remaining are removed. In addition, the seed layers 212" may be configured to be removed by the wet etchant. Consequently, the side gap layer(s) 210" are exposed. FIG. 11 depicts the transducer 200 after step 168 is performed. Thus, the mask 220 is shown. The side gap layer(s) 210" have been exposed. In the embodiment shown, the mask 220 extends to the outer edges of the side gap layer(s) 210". However, in other embodiments, the mask may not extend as far as the outer edges of the side gap layer(s) 210" or may extend farther than the outer edges of the side gap layer(s). In such embodiments, however, the mask 220 still completely covers the pole 204' so that the etchant used does not attack the pole 204'.

Figure 12:
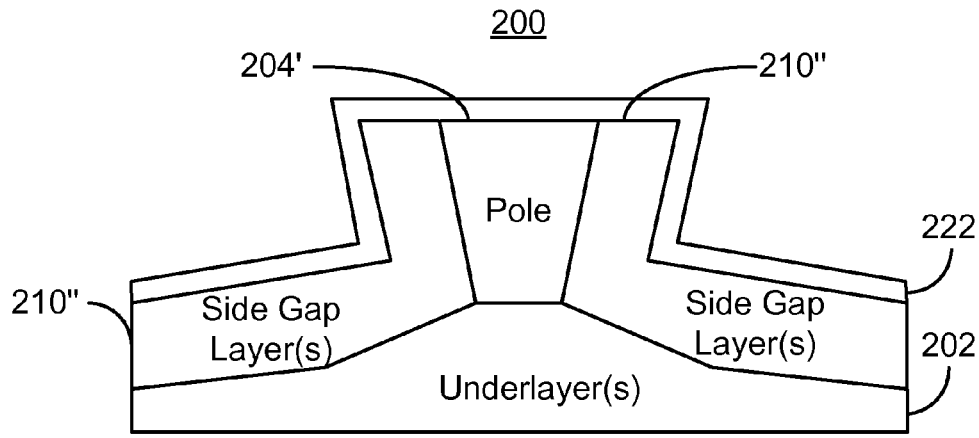

A write gap is deposited after the sacrificial layer(s) 214" are removed, via step 170. The write gap used is nonmagnetic and might, for example, be metallic or insulating. FIG. 12 depicts the transducer 200 after step 170 is performed. Thus, a write gap 222 is shown. The write gap 222 resides on the top of the pole 204' and a portion of the side gap layer(s) 210". In the embodiment shown, the write gap 222 completely covers the side gap layer(s) 210". More specifically, the write gap 222 may be self-aligned. As a result, the write gap 222 extends substantially evenly on both sides of the pole 204', and is aligned to the pole 204' without additional processing.

A seed layer may be optionally provided, via step 172. The seed layer may be used for a wrap around shield that is desired to be plated. Where the write gap 222 is metallic and/or has a sufficiently high conductivity that the material used for the shields may be plated or otherwise deposited on the write gap 222, a separate seed layer might be omitted. If the seed layer is nonmagnetic, it may be functionally part of the write gap. If the seed layer is magnetic, then the seed layer might be considered part of the shield.

Figure 13:
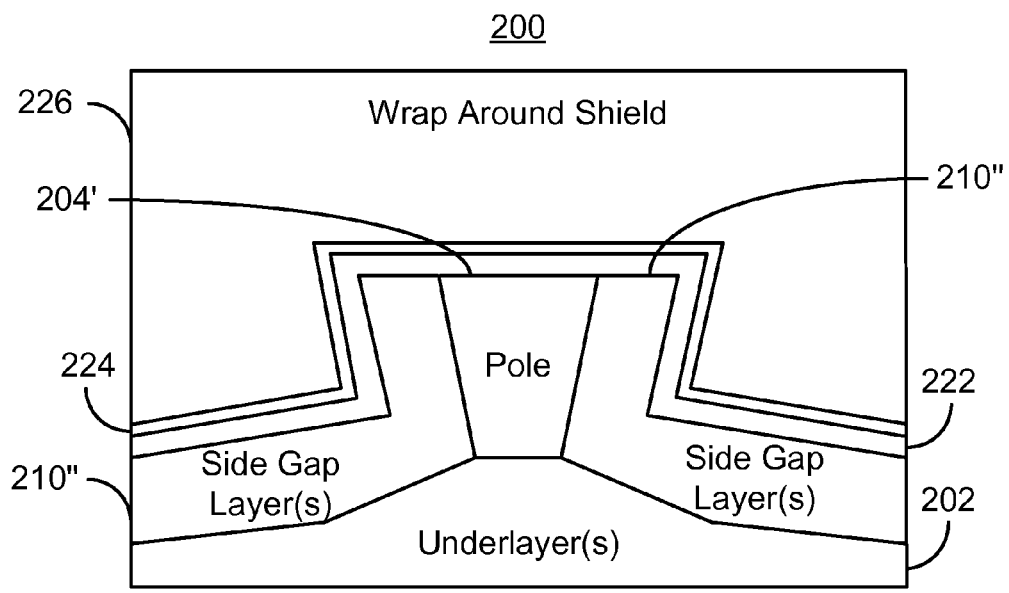

A wrap around shield may be provided, via step 174. In some embodiments, step 174 includes plating the wrap around shield. Fabrication of the PMR transducer may then be completed. FIG. 13 depicts the transducer 200 after step 174 is performed. Thus, a wrap around shield 226 is shown. The shield 226 may be made of a high moment magnetic material.

Thus, using the method 150, the PMR transducer 200 may be formed. More specifically, a wrap around shield may 226 over a self-aligned write gap 222 may be formed. Consequently, misalignments of the write gap 222 and the attendant increases in stray side fields may be reduced or eliminated. Using the method 150, therefore, the transducer 200 having improved performance may be fabricated.

We claim:

1. A magnetic recording transducer comprising:
   a pole having at least one side, a bottom, a top wider than the bottom, the top having a bevel therein;
   at least one side gap covering the at least one side of the pole;
   a self-aligned write gap covering the top of the pole and the at least one side gap; and
   a wrap around shield, the self aligned write gap residing between the wrap around shield and the top of the pole and between the wrap around shield and the at least one side gap.

2. The magnetic recording transducer of claim 1 wherein the write gap is a metal write gap.

3. The magnetic recording transducer of claim 1 wherein the write gap is an insulator.

4. The magnetic recording transducer of claim 1 wherein the bevel is a trailing edge bevel.

5. A disk drive comprising:
   a slider; and
   a head residing on the slider and including a magnetic recording transducer having a pole, at least one side gap, a self-aligned write gap, and a wrap around shield, the pole including at least one side, a bottom, a top wider than the bottom, the top having a bevel therein, the at least one side gap covering the at least one side of the pole, the self-aligned write gap covering the top of the pole and the at least one side gap, the self aligned write gap residing between the wrap around shield and the top of the pole and between the wrap around shield and the side gap.

\* \* \* \* \*